(12) United States Patent
Erdem et al.

(10) Patent No.: US 9,512,262 B2
(45) Date of Patent: Dec. 6, 2016

(54) POLYURETHANE DISPERSION, METHOD OF PRODUCING THE SAME, COATED ARTICLES, AND METHOD FOR COATING ARTICLES

(75) Inventors: Bedri Erdem, Midland, MI (US); Kumar Nanjundiah, Midland, MI (US); John N. Argyropoulos, Midland, MI (US); Michael C. Kaufman, Apex, NC (US); Jihui Guo, Cary, NC (US); Paul Foley, Midland, MI (US); Debkumar Bhattacharjee, Blue Bell, PA (US)

(73) Assignee: Dow Global Technologies LLC, Midland, MI (US)

( * ) Notice: Subject to any disclaimer, the term of this patent is extended or adjusted under 35 U.S.C. 154(b) by 171 days.

(21) Appl. No.: 13/262,572

(22) PCT Filed: Feb. 8, 2010

(86) PCT No.: PCT/US2010/023458
§ 371 (c)(1),
(2), (4) Date: Oct. 24, 2011

(87) PCT Pub. No.: WO2010/114643
PCT Pub. Date: Oct. 7, 2010

(65) Prior Publication Data
US 2012/0035318 A1 Feb. 9, 2012

Related U.S. Application Data

(60) Provisional application No. 61/165,024, filed on Mar. 31, 2009.

(51) Int. Cl.
| | | |
|---|---|---|
| *C08G 18/08* | (2006.01) | |
| *C08G 18/36* | (2006.01) | |
| *C08G 18/66* | (2006.01) | |
| *C09D 175/04* | (2006.01) | |
| *B32B 27/40* | (2006.01) | |

(52) U.S. Cl.
CPC ........... *C08G 18/6662* (2013.01); *B32B 27/40* (2013.01); *C08G 18/0819* (2013.01); *C08G 18/0823* (2013.01); *C08G 18/36* (2013.01); *C09D 175/04* (2013.01)

(58) Field of Classification Search
CPC ............ C08G 18/6662; C08G 18/0819; C08G 18/0823; C08G 18/36; C09D 175/04; B32B 27/40
USPC ...... 524/589, 590, 591, 839, 840; 428/423.1
See application file for complete search history.

(56) References Cited

U.S. PATENT DOCUMENTS

| | | |
|---|---|---|
| 3,941,733 A | 3/1976 | Chang |
| 4,496,487 A | 1/1985 | Peerman et al. |
| 6,359,060 B1 | 3/2002 | Schafheutle et al. |
| 6,559,225 B1 | 5/2003 | Irle et al. |
| 2001/0038918 A1 | 11/2001 | Weikard et al. |
| 2006/0148980 A1 | 7/2006 | Tielemans et al. |
| 2007/0141264 A1 | 6/2007 | Satgurunathan et al. |
| 2007/0213445 A1 | 9/2007 | Klijn et al. |
| 2008/0171832 A1* | 7/2008 | Gertzmann et al. .......... 524/839 |
| 2011/0015292 A1* | 1/2011 | Radhakrishnan ...... C08G 18/12 521/170 |

FOREIGN PATENT DOCUMENTS

| | | |
|---|---|---|
| DE | 4020455 A1 | 1/1992 |
| EP | 1849810 A1 | 10/2007 |
| WO | WO-9523818 A1 | 9/1995 |
| WO | WO-2004/096882 | 11/2004 |
| WO | WO-2004/096883 | 11/2004 |
| WO | WO 2006/047431 | * 5/2006 |

OTHER PUBLICATIONS

Bontinck et al., "New UV-Curable Coatings for the Resilient Flooring Industry", Radtech Report, May/Jun. 2003, pp. 50-55.*
DGTL EP Application No. 10703779.8, Response dated May 22, 2012.
DGTL EP Application No. 10703779.8, Rejection dated Nov. 8, 2011.
PCTUS2010/023458, International Search Report & Written Opinion.
PCTUS2010/023458, International Preliminary Report on Patentability.
Japanese Response to Office Action dated Dec. 8, 2014; from Japanese counterpart Application No. 2012-503440.
Japanese Associate letter dated Aug. 7, 2014 and counterpart Japanese Application No. 2012-503440 Office Action dated Jul. 8, 2014, 6 pages.
Instructions to Japanese Office Action dated Sep. 8, 2014; from counterpart Japanese Application No. 2012-503440.
Australian Response to Examination Report dated Dec. 20, 2013; from AU counterpart Application No. 2010232930.
Instructions to Japanese Office Action dated Jan. 14, 2014; from JP counterpart Application No. 2012-503440.
Japanese Response to Office Action dated Jan. 17, 2014; from JP counterpart Application No. 2012-503440.
Japanese Office Action Jun. 1, 2015; from Japanese counterpart Application No. 2012-503440.
Japanese Office Action dated Oct. 23, 2015; from Japanese counterpart Application No. 2012-503440.
Korean Office Action dated Jun. 21, 2016; from Korean counterpart Application No. 10-2011-7025635.

* cited by examiner

*Primary Examiner* — Patrick Niland (57) ABSTRACT

The instant invention is a polyurethane dispersion, method of producing the same, coated articles, and method for coating articles. The polyurethane dispersion according to the present inventions includes (a) one or more polyurethane units derived from one or more prepolymers wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols; and (b) water.

3 Claims, 6 Drawing Sheets

Cross sectional area – ½ bh

MMR (Pa) = Normal Load (N) / Area

POLYURETHANE DISPERSION, METHOD OF PRODUCING THE SAME, COATED ARTICLES, AND METHOD FOR COATING ARTICLES

CROSS-REFERENCE TO RELATED APPLICATIONS

This application is a non-provisional application claiming priority from the U.S. Provisional Patent Application No. 61/165,024, filed on Mar. 31, 2009, entitled "POLYURETHANE DISPERSION, METHOD OF PRODUCING THE SAME, COATED ARTICLES, AND METHOD OF COATING ARTICLES," the teachings of which are incorporated by reference herein, as if reproduced in full hereinbelow.

FIELD OF INVENTION

The instant invention relates to a polyurethane dispersion, method of producing the same, coated articles, and method for coating articles.

BACKGROUND OF THE INVENTION

Stain resistance, mar resistance, and hardness properties are important performance property for surface coating applications such as wood coating applications, concrete coating applications, or metal coating applications. Polyurethane dispersions are commonly used by the original equipment manufacturer or subsequent user, for example, Do IT Yourself, applications to coat, for example, wood surfaces. For most of the wood coatings, contact with various foods and dyes requires a relatively high levels of stain resistance to everyday use liquids like coffee, orange juice, ketchup and other wide variety of food products. In general, mar resistance directly correlates to the durability of the coating. Hence a coating with good hardness, chemical resistance, water resistance, scratch resistance, and mar resistance is desired for wood substrates. Several approaches have been used to promote better properties for such wood substrates. These approaches include, for example, incorporating acrylic/vinyl functionality (hybrids and blends), fatty acid modification to the backbone, cross linking, incorporating UV curable moieties as well as more exotic chemistries such a fluorination, chlorination, to the polyurethane dispersions. A wide variety of molecules have also been added in the formulation stages to tackle individual short comings in properties. These approaches result in extra cost and effort to achieve the desired performances.

Accordingly, there is still a need for a polyurethane dispersion with improved properties suitable for surface coatings such as wood coatings, concrete coatings, or metal coatings. Furthermore, there is a need for a method for producing such polyurethane dispersions with improved properties suitable for surface coatings such as wood coatings, concrete coatings, or metal coatings.

SUMMARY OF THE INVENTION

The instant invention is a polyurethane dispersion, method of producing the same, coated articles, and method for coating articles. The polyurethane dispersion according to the present inventions includes (a) one or more polyurethane units derived from one or more prepolymers wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols; and (b) water. The process for producing a polyurethane dispersion include the steps of: (1) providing a first stream comprising one or more prepolymers, wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols, and wherein the one or more prepolymers are optionally neutralized with one or more neutralizing agents; (2) providing a second stream comprising water; (3) merging said first stream and said second stream together; (4) thereby forming prepolymer dispersion; (5) optionally neutralizing said prepolymer dispersion; (6) chain extending said prepolymers; (7) thereby forming the polyurethane dispersion. The coated articles according to the present invention comprise a substrate; and a coating associated with one or more surfaces of the substrate, wherein the coating is derived from the inventive polyurethane dispersion, as described hereinabove. The method of coating an article according to the present invention comprises the steps of: (1) selecting a substrate; (2) selecting a coating composition comprising the inventive polyurethane dispersion, as described hereinabove, (3) applying the coating composition to one or more surfaces of the substrate; (4) removing at least a portion of the water; (5) thereby forming a coated article.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention is a polyurethane dispersion, method of producing the same, coated articles, and method for coating articles. The polyurethane dispersion according to the present inventions includes (a) one or more polyurethane units derived from one or more prepolymers, wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols; and (b) water. The process for producing a polyurethane dispersion include the steps of: (1) providing a first stream comprising one or more prepolymers, wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols, and wherein the one or more prepolymers are optionally neutralized with one or more neutralizing agents; (2) providing a second stream comprising water; (3) merging said first stream and said second stream together; (4) thereby forming prepolymer dispersion; (5) optionally neutralizing said prepolymer dispersion; (6) chain extending said prepolymers; (7) thereby forming the polyurethane dispersion. The coated articles according to the present invention comprise a substrate; and a coating associated with one or more surfaces of the substrate, wherein the coating is derived from the inventive polyurethane dispersion, as described hereinabove. The method of coating an article according to the present invention comprises the steps of: (1) selecting a substrate; (2) selecting a coating composition comprising the inventive polyurethane dispersion, as described hereinabove, (3) applying the coating composition to one or more surfaces of the substrate; (4) removing at least a portion of the water; (5) thereby forming a coated article.

The polyurethane dispersion according to the instant invention may further comprise one or more fillers, one or more crosslinking agents, one or more defoaming agents, one or more pigments or colorants, one or more rheology modifying agents, one or more adhesion promoting agents, one or more mar and slip agents, one or more wetting agents, one or more anti-freeze agents, one or more biocides or anti-microbial agents; one or more surfactants; one or more UV stabilizing agents; one or more antioxidants; one or more flow control agents, and combinations thereof.

The average particle size diameter of the solid content of the present inventive polyurethane dispersion is in range of from 50 to 1000 nm; for example, the average particle size diameter is in the range of from 50 to 500 nm; or in the alternative, from 50 to 500 nm; or in the alternative, from 50 to 150 nm; or in the alternative, from 60 to 100 nm; or in the alternative, from 60 to 80 nm. The present inventive polyurethane dispersion may have a solid content in the range of from 20 to 60 weight percent, not including the weight of any additional fillers; for example, the solid content is in the range of from 30 to 50 weight percent; or in the alternative, from 20 to 50 weight percent; or in the alternative, from 30 to 40 weight percent. The present inventive polyurethane dispersion has a viscosity in the range of from 100 to 3000 cPs at 25° C.; for example, from 100 to 1000 cPs at 25° C.; or in the alternative from 200 to 900 cPs at 25° C.; or in the alternative from 200 to 600 cPs at 25° C. The present inventive polyurethane dispersion may comprise 0 to 30, or 5 to 25, or 5 to 20, or 0 to 20 percent by weight of one or more solvents.

The one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols.

Natural Oil Based Polyols

The natural oil based polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. The natural product may contain at least about 85 percent by weight unsaturated fatty acids. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

Several chemistries can be used to prepare the natural oil based polyols. Such modifications of a renewable resource include, but is not limited to, for example, epoxidation, hydroxylation, ozonolysis, esterification, hydroformylation, or alkoxylation. Such modifications are commonly known in the art.

After the production of such polyols by modification of the natural oils, the modified products may be further alkoxylated. The use of ethylene oxide (EO) or mixtures of EO with other oxides, introduces hydrophilic moieties into the polyol. In one embodiment, the modified product undergoes alkoxylation with sufficient EO to produce a natural oil based polyol with between 10 weight percent and 60 weight percent EO, for example, between 20 weight percent and 40 weight percent EO.

In another embodiment, the natural oil based polyols are obtained by a multi-step process wherein the animal or vegetable oils/fats are subjected to transesterification and the constituent fatty acids recovered. This step is followed by hydroformylating carbon-carbon double bonds in the constituent fatty acids to form hydroxymethyl groups, and then forming a polyester or polyether/polyester by reaction of the hydroxymethylated fatty acid with an appropriate initiator compound. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil based polyols may be any initiator used in the production of conventional petroleum-based polyols. The initiator may, for example, be selected from the group consisting of neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In the alternative, the initiator may be selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. In another alternative, the initiator is glycerol, trimethylopropane, pentaerythritol, sucrose, sorbitol, and/or mixture thereof.

In one embodiment, the initiators are alkoxlyated with ethylene oxide or a mixture of ethylene oxide and at least one other alkylene oxide to give an alkoxylated initiator with a molecular weight between 200 and 6000, preferably between 500 and 3000.

The functionality of the at least one natural oil based polyol, is above about 1.5 and generally not higher than about 6. In one embodiment, the functionality is below about 4. In one embodiment the functionality is in the range of from 1.5 to 3. The hydroxyl number of the at least one natural oil based polyol is below about 150 mg KOH/g, preferably between 50 and 120, more preferably between 60 and 120. In one embodiment, the hydroxyl number is below about 100.

The level of renewable feedstock in the natural oil based polyol can vary between 10 and 100 percent, usually between 10 and 90 percent.

The natural oil based polyols may constitute up to about 90 weight percent of a polyol blend. However, in one embodiment, the natural oil based polyol may constitute at least 5 weight percent, at least 10 weight percent, at least 25 weight percent, at least 35 weight percent, at least 40 weight percent, at least 50 weight percent, or at least 55 weight percent of the total weight of the polyol blend. The natural oil based polyols may constitute 40 percent or more, 50 weight percent or more, 60 weight percent or more, 75 weight percent or more, 85 weight percent or more, 90 weight percent or more, or 95 weight percent or more of the total weight of the combined polyols. Combination of two types or more of natural oil based polyols may also be used.

The viscosity measured at 25° C. of the natural oil based polyols is generally less than about 6,000 mPa·s; for example, the viscosity measured at 25° C. of the natural oil based polyols is less than about 5,000 mPa·s. The natural oil based polyol may have a molecular weight in the range of from 500 to 3000 daltons; for example, from 800 to 1500 daltons.

NOP may be a blend with any of the following:
aliphatic and aromatic polyester polyols including caprolactone based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

Short Chain Diols and Adipate Polyols

A short chain polyol, for example a short chain diol, component can be a product of alkoxylating a difunctional initiator. In the alternative, the short chain polyol may be the product of alkoxylating a multifunctional initiator. The short chain diol may, for example, be a polyoxypropylene diol, but it can also be a mixed ethylene oxide propylene oxide polyol, as long as at least 75 weight percent of the alkoxides used, if present, is propylene oxide. Diols such as propylene glycol, diethylene glycol, dipropylene glycol, and the like, can also be used with the formulations of the present invention. The short chain diol component of the prepolymer formulations, if present, has a molecular weight of from 50 to 500; or in the alternative, from 50 t0 250; or in the alternative, from 90 to 220 g/mole. Exemplary short chain polyols, such as short chain diols, include, but are not limited to, reagents having at least 2 or more hydroxyl functionality and molecular weight between 50 to 500 g/mole. Such short chain polyols include, but are not limited to, aliphatic, aromatic, alicyclic dihydric alcohol and dialkylene glycols. The examples of short chain polyols include but are note limited to, diethyleneglycole, dipropylene glycole, 1,2-, 1,3-, 2,3-, and 1,4 butanediol, neopentyl glycole, 3-methyl-1,5-pentanediol, 1,3/1,4 isomers of cyclohexanedimethanol, 1-5 pentanediol, 1,6 hexanediol, 2-methyl-1,8 octanediol, 1,9 nonanediol, 1,12 dodecanediol, low molecular weight diol having cyclic group as described in JP-B No. 45-1474 as short chain diol, trimethylolpropane, glycerine, hexanetriol, pentaerythritol, sorbitol and sugars and their derivatives. These polyols are used with adipic acid and its derivatives to form adipate polyols.

Short chain polyols, for example, short chain diols, may further include one or more ionic groups. Functional moieties used in the preparation of such polyols with ionic group include sulfonic acid diol, for example, 3-(2,3-dihydroxypropxy)-1-propane-sulfonic acid; sulfopolycarboxylic acid, for example, sulfoisophthalic acid, sulfosuccinic acid; and aminosulfonic acid, for example, 2-aminoethanesulfonic acid and 3-amino propranesulfonic acid; sulfamic acid diol, for example, N,N-bis(2-hydroxylalkyl)sulfamic acid (C1 to C6 of alkyl group), or its alkylene oxide (AO) adduct such as ethylene oxide and propylene oxide, N,N-bis(2-hydroxyethyl)sulfamic acid; bis(2-hydroxyethyl)phosphate; dialkylol alkanoic acid C6 to C24, for example, 2,2-dimethylol propionic acid, 2,2-dimethylol butanoic acid, 2,2-dimethylol heptanoic acid, 2,2-dimethylol octanic acid; and amino acid, for example, 2-aminoethanoic acid; and salts thereof, for example, salts of amines such as triethylamine, alkanolamine, morpholine, and/or alkali metal salts such as sodium salt. Examples containing cationic group include, but are not limited to, quaternary ammonium base-containing diol, tertiary ammonium group-containing diol and salts thereof.

Isocyanate:

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis(isocyanatemethyl) isocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

First Surfactant

The first surfactant may comprise less than 6 percent by weight; for example, the first surfactant may comprise 4 to 6 weight percent. Exemplary first surfactants include, but are not limited to, dimethylol propionic acid, dimethylol botanic acid, and diaminosulfonate.

Solvent

The solvent may be any solvent; for example, the solvent may be an organic solvent. Exemplary solvents include, but are not limited to dipropylene glycol dimethyl ether, which is commercially available from The Dow Chemical Company under the tradename PROGLYDE® DMM, and tripropylene glycol dimethyl ether. Additional solvents may include acetone, methyl ethyl ketone, toluene, Tetrahydrofuran (THF).

Prepolymer:

The prepolymer is the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols.

The polyurethane prepolymer used in the present invention may be produced by any conventionally known processes, for example, solution process, hot melt process, or polyurethane prepolymer mixing process, for example, in batch or continuous process. Furthermore, the polyurethane prepolymer may, for example, be produced via a process for reacting a polyisocyanate compound with an active hydrogen-containing compound, that is, a mixture comprising one or more natural oil based polyols, and one or more adipate polyols, and optionally one or more short diols, and examples thereof include a process for reacting a polyisocyanate compound with a mixture comprising one or more natural oil based polyols, and one or more adipate polyols, and optionally one or more short diols in an organic solvent, followed optionally by removal of the solvent. In one embodiment, the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols.

For example, the polyisocyanate compound may be reacted with a mixture comprising one or more natural oil based polyols, and one or more adipate polyols, and optionally one or more short diols in an organic solvent at a temperature in the range of 20° C. to 150° C.; or in the alternative, in the range of 30° C. to 130° C., at an equivalent ratio of an isocyanate group to an active hydrogen group of, for example, from 1.1:1 to 3:1, or in the alternative, from 1.2:1 to 2:1. In the alternative, the prepolymer may be prepared with an excess amount of active hydrogen group thereby facilitating the production of hydroxyl terminal polymers.

The polyurethane prepolymer derived from a mixture comprising one or more natural oil based polyols, and one or more adipate polyols, and optionally one or more short diols in an organic solvent could be prepared in the presence of one or more reactive or un-reactive ethylenically unsaturated monomers. Such monomers may further be polymerized to produce hybrid polyurethane dispersions.

The polyurethane prepolymer may further include one or more ionic groups. Functional moieties used in the preparation of such prepolymers with ionic group include sulfonic acid diol, for example, 3-(2,3-dihydroxypropxy)-1-propanesulfonic acid; sulfopolycarboxylic acid, for example, sulfoisophthalic acid, sulfosuccinic acid; and aminosulfonic acid, for example, 2-aminoethanesulfonic acid and 3-amino propranesulfonic acid; sulfamic acid diol, for example, N,N-bis(2-hydroxylalkyl)sulfamic acid (C1 to C6 of alkyl group), or its alkylene oxide (AO) adduct such as ethylene oxide and propylene oxide, N,N-bis(2-hydroxy-ethyl)sulfamic acid; bis(2-hydroxyethyl)phosphate; dialkylol alkanoic acid C6 to C24, for example, 2,2-dimethylol propionic acid, 2,2-dimethylol butanoic acid, 2,2-dimethylol heptanoic acid, 2,2-dimethylol octanic acid; and amino acid, for example, 2-aminoethanoic acid; and salts thereof, for example, salts of amines such as triethylamine, alkanolamine, morpholine, and/or alkali metal salts such as sodium salt. Examples containing cationic group include, but are not limited to, quaternary ammonium base-containing diol, tertiary ammonium group-containing diol and salts thereof.

The polyurethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

When the ionic group is an anionic group, the neutralizer used for neutralization includes, for example, nonvolatile bases such as sodium hydroxide and potassium hydroxide; and volatile bases such as tertiary amines (for example, trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the polyurethane prepolymer having an ionic group. The neutralization may be affected by adding the neutralizing agent directly the polyurethane prepolymer or by adding to the aqueous phase of during the production of polyurethane dispersion.

The prepolymers may be chain extended via a chain extender. Any chain extender known to be useful to those of ordinary skill in the art of preparing polyurethanes can be used with the present invention. Such chain extenders typically have a molecular weight of 30 to 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender may be used as a solution of chain extender in water.

Polyurethane Dispersion (PUD) Preparation

PUDs according to the present invention may be produced via batch process or continuous process. Polyurethane prepolymer, optionally one or more surfactants, and water are fed into a mixer, for example, an OAKS Mixer or an IKA Mixer, thereby dispersing the polyurethane prepolymer into the water, and then it is chain extended with a primary or secondary amine to form the PUD.

In one embodiment, the process for producing a polyurethane dispersion comprises the steps of: (1) providing a first stream comprising one or more prepolymers, wherein the one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols, and wherein the one or more prepolymers are optionally neutralized with one or more neutralizing agents; (2) providing a second stream comprising water; (3) merging said first stream and said second stream together; (4) thereby forming prepolymer dispersion; (5) optionally neutralizing said prepolymer dispersion; (6) chain extending said prepolymers; (7) thereby forming the polyurethane dispersion.

End-Use Applications

The coated articles according to the present invention comprise a substrate; and a coating associated with one or more surfaces of the substrate, wherein the coating is derived from the inventive polyurethane dispersion, as described hereinabove. The one or more surfaces of the substrate may be treated, for example, primed, prior to the application of the inventive polyurethane dispersion of the present invention. The substrate may be any substrate; for example, the substrate may comprise wood, concrete, plastic, and combinations thereof.

The method of coating an article according to the present invention comprises the steps of: (1) selecting a substrate; (2) selecting a coating composition comprising the inventive polyurethane dispersion, as described hereinabove, (3) applying the coating composition to one or more surfaces of the substrate; (4) removing at least a portion of the water; (5) thereby forming a coated article.

The inventive polyurethane dispersion may be applied to one or more surfaces of a substrate via any method; for example, via spraying, brushing, dipping, drawdowns and the like.

The polyurethane dispersion of the present invention are film forming compositions. Films derived from the inventive polyurethane dispersion may have a thickness in the range of from 1 μm to 2 mm; or in the alternative, 1 to 500 μm; or in the alternative, 1 to 200 μm; or in the alternative, 1 to 100 μm; or in the alternative, 20 μm to 50 μm. The films derived from the present polyurethane dispersions have an improved Micro Mar Resistance of at least 2×, or at least 5×, or at least 6× better that a relative comparative film. The films derived from the present polyurethane dispersions have a Konig Hardness in the range of about greater than 125 seconds; or in the alternative, greater than 130 seconds; or in the alternative, greater than 135 seconds; or in the alternative, greater than 140 seconds; or in the alternative, greater than 145 seconds, according to ASTM D-4366. The films derived from the present polyurethane dispersions have a rating of Water Resistance in the range of 0 on a scale of 0 to 5, wherein 0 is no swelling or blemish and wherein 5 is disintegrated, according to the ASTM D-870.

EXAMPLES

The following examples illustrate the present invention but are not intended to limit the scope of the invention.

Figure 1:
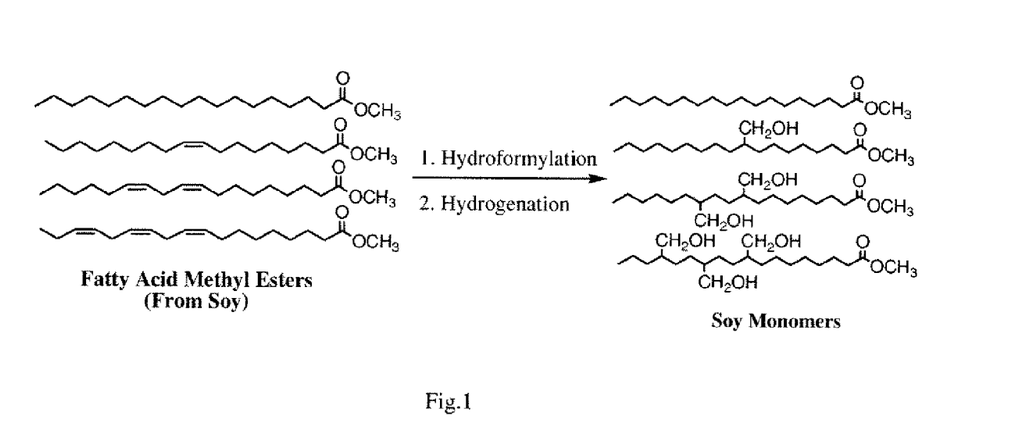
FIG. 1 illustrates a first embodiment of a soy monomer chemistry.

Synthesis of Natural Oil Based (NOP) Polyols:

The natural oil polyols (NOPs) were prepared in three reaction steps from the fatty acid methyl esters (FAMES) derived from soy oil. The FAMES are first hydroformylated to the aldehyde intermediates and then hydrogenated in the second step to the soy monomers, as shown in FIG. 1. The average hydroxyl functionality of the soy monomers is approximately 1.0. The target molecular weight for the NOPs were between 800 to 1000 g/mole, and the actual molecular weight for the NOPs was approximately 845 g/mole. The target for the hydroxyl number was between 112 to 140 mg KOH/g.

The resulting monomers are then transesterified with a suitable glycol. In this process, polyol molecular weight advances both by condensation of the monomers with the glycol initiator and self condensation of the monomers. By controlling average functionality of the monomers and their ratio to the glycol initiator, both polyol molecular weight and average functionality can be systematically controlled. Furthermore, the structure of the initiator can be adjusted to obtain desired performance characteristics or compatibility. Preferred glycol initiators contain reactive primary hydroxyl groups, such as 1,6-hexanediol and UNOXOL® Diol. UNOXOL® Diol is a liquid cycloaliphatic diol that is an approximately 50:50 mixture of 1,3-cyclohexanedimethanol and 1,4-cyclohexanedimethanol, which is a mixture of cis and trans isomers. As a result of this chemistry, the polyols contain primary hydroxyl groups and no unsaturation.

Synthesis of 1,3/1,4(cis, trans mixture) cyclohexane dimethanol) adipate polyol

The adipate polyol was prepared according to the following procedure, based on the following formulation.

| Material | weight | Actual weight |
| --- | --- | --- |
| UNOXOL ® Diol (FW = 144.21) | 821.688 g | 821.69 g |
| Adipic acid (FW = 146.14) | 600.0 g | 600.104 g |
| Expected water (b.p. = 100° C.) | 148 g or ~148 ml | — |
| Dibutyltinoxide | 1.25 g | 1.26 g |

Target FW = 800 g/mol
Hydroxyl number = 140

A 3 neck 2000 ml round bottom flask was equipped with a mechanical stirrer, a dien star trap, condenser, and nitrogen bubbler system. Into the flask was placed UNOXOL® Diol, adipic acid, and Dibutyltinoxide.

The system was flushed with nitrogen for about 15 min before heating. The contents were slowly brought to 150° C. and held there for 8 hours. 104 ml water was collected after 8 hours. Shut off for the night. Reheated to 150° C. next morning. Ran for 8 hours more with Nitrogen purge to the flask. Collected 0 ml water. The temperature was left at 150° C. and nitrogen was blown through the system for 8 more hours. 0 ml water was collected. Shut off for the night. Reheat to 160° C. next morning. Run for 8 hours more with nitrogen purge to the flask. Collected 0 ml methanol. Reheated to 160° C. next morning. Ran for 8 hours more with nitrogen purge to the flask. Collected 0 ml methanol. The temperature was left at 160° C. and nitrogen was blown through the system for 8 more hours. 0 ml methanol was collected.

Prepolymer Preparation Procedure

Preparation of prepolymers was carried out in a 500-mL, 4-neck round-bottom flask equipped with an addition device, water-cooled condenser, mechanical stirrer, thermometer, and nitrogen inlet/outlet tubes. Nitrogen purge and an agitation rate of 500 rpm were applied throughout the course of the reaction. An oil bath was used as the heating source to maintain reaction temperature. In a typical prepolymer preparation, polyester polyols and dimethylolpropionic acid [DMPA] were added into the reaction flask, followed by the addition of isocyanate. The polyols, which were added either individually or as a blend, were initially heated to a temperature of 15-20° C. below the desired reaction temperature. Upon completion of the polyol and solvent additions, the reaction mixture was heated to the desired temperature (80-90° C.) with agitation (200 rpm). Once the theoretical percent NCO is reached, the final product was transferred to sample containers with a nitrogen blanket and used for dispersion. Suitable solvents for the prepolymer include acetone, methyl ethyl ketone and the dimethyl ether of dipropylene glycol.

Polyurethane Dispersion (PUD) Synthesis

PUDs were prepared in a small scale (500 ml) batch process where the prepolymer was neutralized using a tertiary amine (for example, triethyl amine, TEA) at 95-110 percent stoichiometric amount (moles) of the acid used in the prepolymer. Predetermined amount of the water was slowly added to the prepolymer as it was vigorously mixed using a special mixer generating high shear. (50,000-100,000 $sec^{-1}$). The water was continuously added as the dispersion viscosity dropped below ~3000 cP (Brookfield Spindle #4, 50 rpm). The dispersion was then fully chain extended with an amine (for example, ethylene diamine). The final dispersions had a solids content ~35 wt percent and number average particle size ~100 nm.

Inventive Example 1 Preparation

Soy-adipate PUD in PROGLYDE® DMM solvent. The polyol component is a mixture of 50 wt percent NOP polyol and 50 wt percent UNOXOL® adipate polyol having the same molecular weight and functionality. The ingredients of the formulation to prepare the PUD containing 100 gm of prepolymer are given in Table 1.

TABLE 1

Recipe for the synthesis of PUD

| | Weight (gms) | Description |
|---|---|---|
| 1 | 23 | Soy polyol |
| 2 | 23 | UNOXOL ® adipate polyol |

TABLE 1-continued

Recipe for the synthesis of PUD

| | Weight (gms) | Description |
|---|---|---|
| 3 | 6 | UNOXOL ® diol |
| 4 | 5 | DMPA |
| 5 | 43 | Isophorone di isocyanate |
| 6 | 2.96 | Tri-ethyl amine |
| 7 | 3.32 | Ethylene di amine |
| 8 | 25 | PROGLYDE ® DMM solvent |

The procedures described in the previous sections were followed with the above recipe to get the desired PUD. The PUDs were characterized for the percentage solids and particle size before coating them on different substrates. The coatings were prepared on pre-sealed oak wood substrates using a paint brush. The samples were dried for 7 days under ambient conditions (50 percent RH and 23° C.) before testing for properties.

Comparative Example 2 Preparation

The recipe used in inventive example 1 was modified by replacing the NOP and UNOXOL® adipate polyol with a Caprolactone diol of similar molecular weight and functionality. PROGLYDE® DMM was used as the solvent.

Comparative Example 3 Preparation

The recipe used in example 1 was modified by replacing the NOP and UNOXOL® adipate polyol with a FomRez PES-G24-112, provided by Chemtura, polyol of similar molecular weight and functionality. PROGLYDE® DMM was used as the solvent.

Coating Sample Preparation

The coatings samples were prepared on Steel panels and Glass slides using drawdown bar to get a coating with dry thickness ~1.5 mils. The samples were dried for 7 days under ambient conditions (50 percent RH and 23° C.) before testing for properties. Referring to Tables 2 and 3, each sample was measured multiple times, as indicated in each Table, for each physical properties and the effect of various stain agents on coating performance properties, and the results of the measured properties are tabulated in Tables 2 and 3.

TABLE 2

Results of physical property measurements of coatings

| Sample | Konig Hardness (s) (1 sample 3× tested then averaged) | Water* Resistance (1 sample 2× tested then averaged) | Stain* Resistance (1 sample 2× tested then averaged) | Micro Mar Resistance (GPa) (1 sample 3× tested then averaged) | Indentation Hardness (Mpa) (1 sample 3× tested then averaged) | Indentation Modulus (Gpa) (1 sample 3× tested then averaged) |
|---|---|---|---|---|---|---|
| Commercial products | | | | | | |
| A—Alberdingk U915 available from Alberdingk-Boley | 66 | 1 | 10 | 56 | 64.8 | 1.28 |
| B—Bayhydrol XP2557, available from Bayer Material Science | 76 | 0 | 10 | 14 | 39.5 | 0.88 |
| Prepared Samples | | | | | | |
| Inventive Example 1 | 159 | 0 | 7 | 388 | 125 | 2.55 |
| Comparative Example 2 | 124 | 0 | 17 | 37 | 48.7 | 1.28 |
| Comparative Example 3 | 100 | 3 | 6 | 21 | 54.1 | 1.4 |

*Lower value means better stain resistance

TABLE 3

Effect of various stain agents on coating performance

| Sample | Vinegar | Lemon Juice | Orange Juice | Grape Juice | Coffee | Olive oil | Ketchup | Mustard | Total* |
|---|---|---|---|---|---|---|---|---|---|
| Commercial products | | | | | | | | | |
| A—Alberdingk U915 available from Alberdingk-Boley | 0 | 0 | 0 | 1 | 3 | 0 | 1 | 5 | 10 |
| B—Bayhydrol XP2557, available from Bayer Material Science | 0 | 0 | 0 | 1 | 3 | 0 | 1 | 5 | 10 |
| Prepared Samples | | | | | | | | | |
| Inventive Example 1 | 0 | 0 | 0 | 0 | 2 | 0 | 1 | 4 | 7 |
| Comparative Example 2 | 0 | 1 | 1 | 2 | 5 | 1 | 2 | 5 | 17 |
| Comparative Example 3 | 0 | 0 | 0 | 1 | 3 | 0 | 1 | 1 | 6 |

*Lower value means better stain resistance

Konig Hardness

Pendulum (konig) hardness was measured according to ASTM D 4366. The experiment is carried out on coatings made on bare metal substrates. The thickness of coatings used was ~1.5 mil. The test measures the time required for a ball indenter attached to a pendulum placed on the coating to relax after being put into oscillation. The results reported are average of three tests.

Stain Resistance: drops of different stains given in the table were placed on the coating made on metal substrate and covered with a watch glass. The stains were in place for 24 hours (except mustard, which was kept for 1 hour) after which the stain was washed with water and dried. The rating was given from 0 to 5 with 0 depicting no trace of the stain to 5 being maximum (complete) staining.

Indentation Hardness and Modulus

Indentation test is based on applying a small load (5 mN over 30 sec period) while measuring the depth, allowing the polymer to creep and then removing the load and measuring the final depth.

Figure 2:
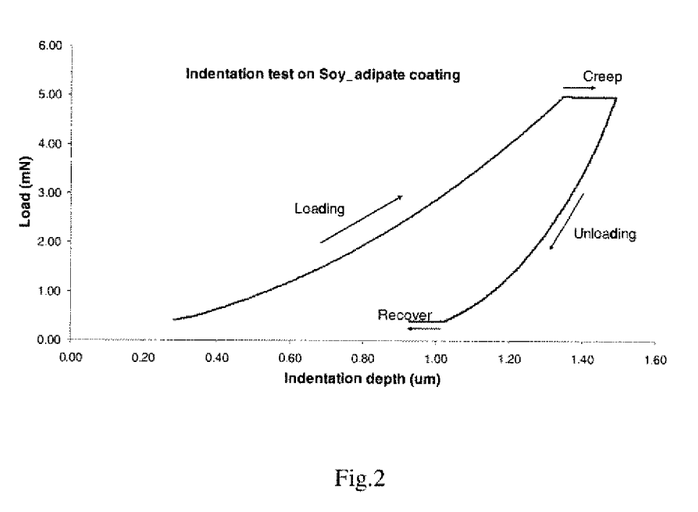
FIG. 2 is a graph illustrating an exemplary relationship between the indentation depth and load.
Figure 3:
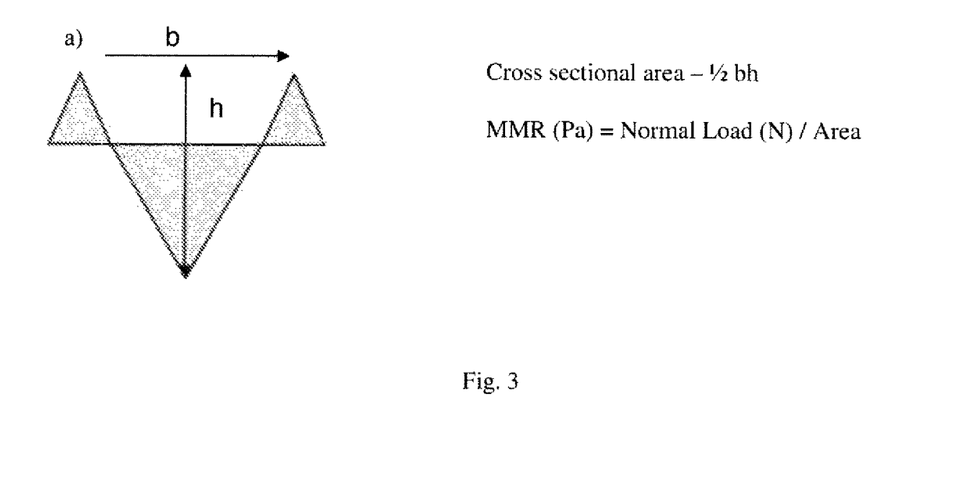
FIG. 3 is an schematic showing the cross section of the scratch and method to calculate MMR.
Figure 4:
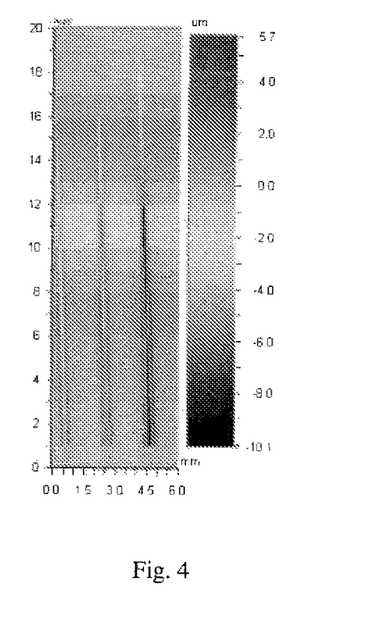
FIG. 4 is an exemplary 2D view of the scratch/mar scanned using a profilometer.
Figure 5:
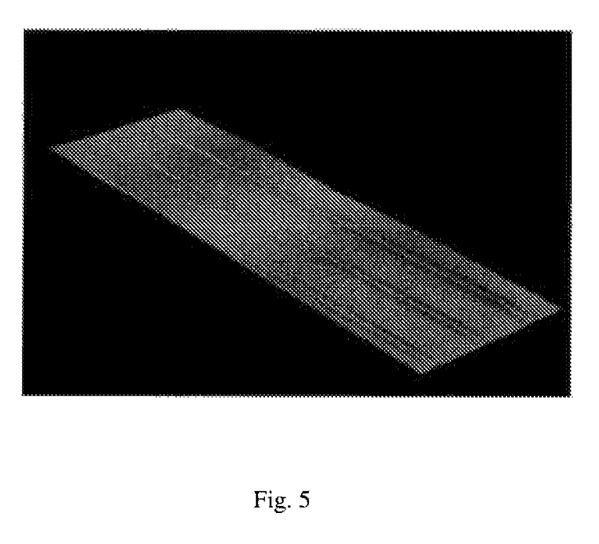
FIG. 5 is an exemplary 3D view of the scratch/mar scanned using a profilometer.

Referring to FIG. 2, by fitting the unloading data, the Hardness, Modulus and recovery aspects of the coating can be determined.

Micro Mar Resistance

Micro Mar Resistance is the resistance to mar and is calculated by measuring the normal load and dividing it by the cross sectional area expressed in Pascal. A mar/scratch with increasing load is made on the coating while measuring the normal as well as the shear forces. By calculating the cross-sectional area the micro mar resistance at a particular normal force is calculated and reported.

Early Hardness Development (ASTM D-4366)

Figure 6:
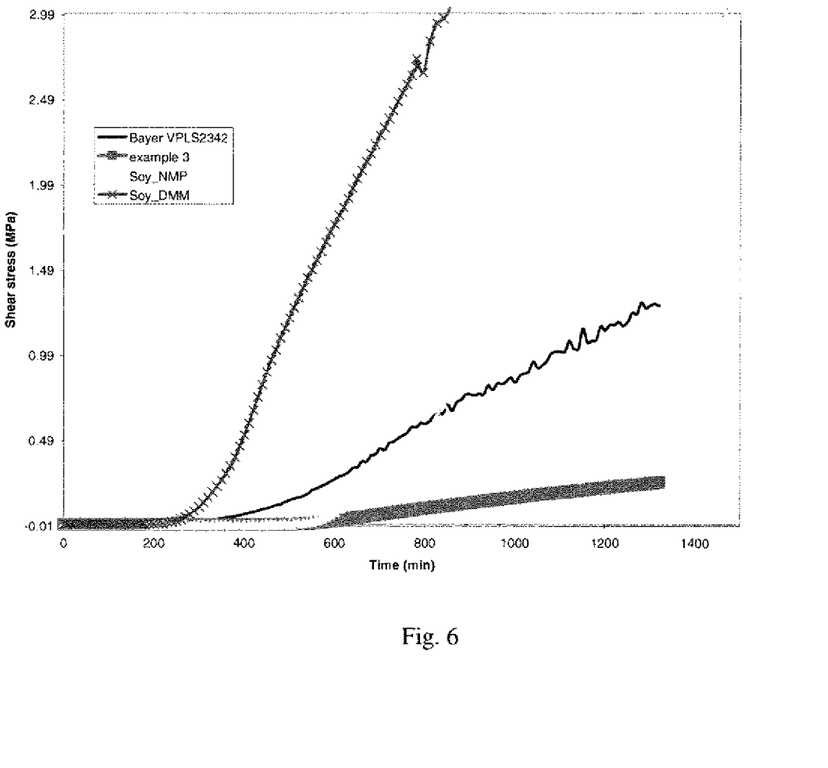
FIG. 6 is a graph illustrating shear stress as a function of time monitoring the early hardness development.

The hardness development was monitored by measuring the modulus over time using dynamic mechanical spectroscopy. The measurements were made in shear mode using modified parallel plate geometry. The aqueous PUD was placed in an aluminum cup with 25 mm diameter and squeezed to a film of thickness of 1 mm by a plate attached to measuring load cell. The oscillatory shear measurement was carried out at 1 Hz with varying percent strain based on the extent of cure. The tests were done at 23° C. and 50 percent RH. Data points were collected every 10 minutes over a period of 24 hours. The hardness development was faster when using the combination of Soy polyols and PROGLYDE® DMM solvent compared to competitor PUDs as well as PUDs made with adipate polyols. The results are shown in the FIG. 6. They y-axis represents shear stress measured every 10 minutes with a frequency of 1 Hz and strain rate in the linear region. The variation in the onset can be attributed to the amount of water in the PUD. The rate or slope of the lines gives the hardness development rate and it can be clearly seen that Soy PUD with PROGLYDE® DMM shows a fast rate of early hardness development.

The present invention may be embodied in other forms without departing from the spirit and the essential attributes thereof, and, accordingly, reference should be made to the appended claims, rather than to the foregoing specification, as indicating the scope of the invention.

We claim:

1. A polyurethane dispersion comprising:
   one or more polyurethanes derived from one or more prepolymers wherein said one or more prepolymers comprise the reaction product of a mixture dissolved in dipropylene glycol dimethyl ether in the presence of one or more first surfactants with one or more isocyanates, wherein said mixture comprises one or more natural oil based polyols, and one or more adipate polyols, and optionally one or more short chain diols, wherein short chain diols are diols which have a molecular weight from 50 to 500 g/mole, the one or more natural oil based polyols are obtained by hydroformylating fatty acid methyl esters derived from one or more natural oils to aldehyde intermediates, hydrogenating the aldehyde intermediates to monomers having an average hydroxyl functionality of above 1.5 and not higher than 6, and transesterifying the monomers with a glycol initiator, thereby obtaining the one or more natural oil based polyols by a combination of condensation of a portion of the monomers with the glycol initiator and self-condensation of another portion of the monomers, the natural oil based polyols containing primary hydroxyl groups and no unsaturation; and
   water
   wherein a film derived from the polyurethane dispersion as a coating on a metal substrate has a Konig Hardness in the range of greater than 125 seconds to equal to and less than 159 seconds according to ASTM D-4366, and a rating of Water Resistance in the range of 0 on a scale of 0 to 5, wherein 0 is no swelling or blemish and wherein 5 is disintegrated, according to the ASTM D-870.

2. A process for producing a polyurethane dispersion comprising the steps of:
providing a first stream comprising one or more prepolymers, wherein said one or more prepolymers comprise the reaction product of a mixture dissolved in dipropylene glycol dimethyl ether in the presence of one or more first surfactants with one or more isocyanates, wherein said mixture comprises one or more natural oil based polyols, and one or more adipate polyols, and optionally one or more short chain diols, wherein short chain diols are diols which have a molecular weight from 50 to 500 g/mole, and wherein said one or more prepolymers are optionally neutralized with one or more neutralizing agents, the one or more natural oil based polyols are obtained by hydroformylating fatty acid methyl esters derived from one or more natural oils to aldehyde intermediates, hydrogenating the aldehyde intermediates to monomers having an average hydroxyl functionality of above 1.5 and not higher than 6, and transesterifying the monomers with a glycol initiator, thereby obtaining the one or more natural oil based polyols by a combination of condensation of a portion of the monomers with the glycol initiator and self-condensation of another portion of the monomers, the natural oil based polyols containing primary hydroxyl groups and no unsaturation;
providing a second stream comprising water;
merging said first stream and said second stream together;
thereby forming prepolymer dispersion;
optionally neutralizing said prepolymer dispersion;
chain extending said prepolymers;
thereby forming said polyurethane dispersion
wherein a film derived from the polyurethane dispersion as a coating on a metal substrate has a Konig Hardness in the range of greater than 125 seconds to equal to and less than 159 seconds according to ASTM D-4366, and a rating of Water Resistance in the range of 0 on a scale of 0 to 5, wherein 0 is no swelling or blemish and wherein 5 is disintegrated, according to the ASTM D-870.

3. A coated article comprising:
a substrate;
a coating associated with one or more surfaces of said substrate, wherein said coating is derived from a polyurethane dispersion comprising;
one or more polyurethanes derived from one or more prepolymers, wherein said one or more prepolymers comprise the reaction product of a mixture dissolved in dipropylene glycol dimethyl ether in the presence of one or more first surfactants with one or more isocyanates, wherein said mixture comprises one or more natural oil based polyols, and one or more adipate polyols, and optionally one or more short chain diols, wherein short chain diols are diols which have a molecular weight from 50 to 500 g/mole, the one or more natural oil based polyols are obtained by hydroformylating fatty acid methyl esters derived from one or more natural oils to aldehyde intermediates, hydrogenating the aldehyde intermediates to monomers having an average hydroxyl functionality of above 1.5 and not higher than 6, and transesterifying the monomers with a glycol initiator, thereby obtaining the one or more natural oil based polyols by a combination of condensation of a portion of the monomers with the glycol initiator and self-condensation of another portion of the monomers, the natural oil based polyols containing primary hydroxyl groups and no unsaturation; and
water
wherein a film derived from the polyurethane dispersion as a coating on a metal substrate has a Konig Hardness in the range of greater than 125 seconds to equal to and less than 159 seconds according to ASTM D-4366, and a rating of Water Resistance in the range of 0 on a scale of 0 to 5, wherein 0 is no swelling or blemish and wherein 5 is disintegrated, according to the ASTM D-870.

* * * * *